(12) United States Patent
Johnson et al.

(10) Patent No.: US 8,678,947 B2
(45) Date of Patent: Mar. 25, 2014

(54) GOLF CLUB GROOVE CONFIGURATION (75) Inventors: Gregory D. Johnson, Carlsbad, CA (US); Helene Hipp, San Diego, CA (US); Kevin Tassistro, Escondido, CA (US); Douglas C. Jorgensen, San Diego, CA (US)

(73) Assignee: Acushnet Company, Fairhaven, MA (US)

( * ) Notice: Subject to any disclaimer, the term of this patent is extended or adjusted under 35 U.S.C. 154(b) by 654 days.

(21) Appl. No.: 12/957,535

(22) Filed: Dec. 1, 2010

(65) Prior Publication Data
US 2011/0118054 A1 May 19, 2011

Related U.S. Application Data (63) Continuation-in-part of application No. 12/505,941, filed on Jul. 20, 2009, now Pat. No. 8,240,021, which is a continuation-in-part of application No. 12/477,570, filed on Jun. 3, 2009, now Pat. No. 7,976,405, which is a continuation-in-part of application No. 11/711,096, filed on Feb. 27, 2007, now Pat. No. 7,568,983, which is a continuation-in-part of application No. 10/902,064, filed on Jul. 30, 2004, now Pat. No. 7,273,422.

(60) Provisional application No. 60/528,708, filed on Dec. 12, 2003.

(51) Int. Cl.
*A63B 53/04* (2006.01)
(52) U.S. Cl.
USPC .......................................................... 473/331
(58) Field of Classification Search
USPC .................................. 473/324–350, 287–292
See application file for complete search history.

(56) References Cited

U.S. PATENT DOCUMENTS

| | | | |
|---|---|---|---|
| 732,136 A | 6/1903 | Taylor | |
| 1,536,616 A | 5/1925 | Manning | |
| 4,413,825 A | 11/1983 | Sasse | |
| 4,508,349 A | 4/1985 | Gebauer et al. | |
| 4,529,203 A | 7/1985 | Ribaudo | |
| 4,858,929 A | 8/1989 | Long | |
| 4,869,508 A | 9/1989 | Miller | |
| 4,902,016 A | 2/1990 | Boone | |
| 5,437,088 A | 8/1995 | Igarashi | |
| 5,591,092 A | 1/1997 | Gilbert | |
| 5,688,186 A | 11/1997 | Michael et al. | |
| 5,755,626 A | 5/1998 | Shira | |
| 6,099,414 A | 8/2000 | Kusano et al. | |
| 6,224,497 B1 | 5/2001 | Antonious | |
| 6,733,400 B2 | 5/2004 | Sherwood | |
| 6,739,984 B1 | 5/2004 | Ciasullo | |
| 6,814,673 B2 | 11/2004 | Wahl et al. | |
| 6,890,270 B2 | 5/2005 | Ciasullo | |
| 7,014,568 B2 | 3/2006 | Pelz | |
| 7,056,226 B2 | 6/2006 | Kennedy | |
| 7,273,422 B2* | 9/2007 | Vokey et al. | 473/330 |
| 7,568,983 B2* | 8/2009 | Gilbert | 473/330 |
| 7,976,405 B2* | 7/2011 | Gilbert et al. | 473/330 |
| 8,240,021 B2* | 8/2012 | Gilbert et al. | 29/557 |
| 2004/0087387 A1 | 5/2004 | Wahl et al. | |
| 2004/0214654 A1 | 10/2004 | Pelz | |

* cited by examiner

OTHER PUBLICATIONS

Determination of Groove Conformance, USGA, Aug. 2008.

*Primary Examiner* — Sebastiano Passaniti
(74) *Attorney, Agent, or Firm* — Randy K. Chang (57) ABSTRACT The present invention is directed to a golf club head with an improved striking surface. The grooves are machined into the strike surface with tight tolerances using a profiled cutter. More specifically, the grooves has a radius of curvature R1 and a draft angle θ forming a relationship that satisfies the equation $R1 \geq (1*10^{-7}\theta^3) - (3*10^{-5}\theta^2) + 0.003\theta - 0.0891$ to achieve a maximum spin performance.

9 Claims, 9 Drawing Sheets

GOLF CLUB GROOVE CONFIGURATION

CROSS-REFERENCE TO RELATED APPLICATIONS

This is a continuation-in-part of U.S. patent application Ser. No. 12/505,941 filed Jul. 20, 2010 now U.S. Pat. No. 8,240,021, which is a continuation-in-part of U.S. patent application Ser. No. 12/477,570, filed Jun. 3, 2009 U.S. Pat. No. 7,976,405, which is a continuation-in-part of U.S. patent application Ser. No. 11/711,096 filed on Feb. 27, 2007 U.S. Pat. No. 7,568,983, which is a continuation-in-part of U.S. patent application Ser. No. 10/902,064 filed on Jul. 30, 2004, now U.S. Pat. No. 7,273,422, which are all incorporated herein by reference in their entireties.

Finally, U.S. patent application Ser. No. 10/902,064 claims the benefit of U.S. Provisional Patent Application No. 60/528,708 filed on Dec. 12, 2003, which is incorporated herein by reference in its entirety.

BACKGROUND OF THE INVENTION

1. Field of the Invention

The present invention relates to golf clubs. In particular, the present invention relates to a golf club head having an improved striking surface.

2. Description of the Related Art

Golf club heads come in many different forms and makes, such as wood- or metal-type, iron-type (including wedge-type club heads), utility- or specialty-type, and putter-type. Each of these styles has a prescribed function and make-up.

Iron-type and utility-type golf club heads generally include a front or striking face, a top line, and a sole. The front face interfaces with and strikes the golf ball. A plurality of grooves, sometimes referred to as "score lines," is provided on the face to assist in imparting spin to the ball. The top line is generally configured to have a particular look to the golfer and to provide structural rigidity for the striking face. A portion of the face may have an area with a different type of surface treatment that extends fractionally beyond the score line extents. Some club heads have the surface treatment wrap onto the top line. The sole of the golf club is particularly important to the golf shot because it contacts and interacts with the ground during the swing.

In conventional sets of iron-type golf clubs, each club includes a shaft with a club head attached to one end and a grip attached to the other end. The club head includes a face for striking a golf ball. The angle between the face and a vertical plane is called the loft angle.

The United States Golf Association (USGA) publishes and maintains the Rules of Golf, which govern golf in the United States. Appendix II to the USGA Rules provides several limitations for golf clubs. For example, the width of a groove cannot exceed 0.035 inch, the depth of a groove cannot exceed 0.020 inch, and the surface roughness within the area where impact is intended must not exceed that of decorative sand-blasting or of fine milling. The Royal and Ancient Golf Club of St Andrews, which is the governing authority for the rules of golf outside the United States, provides similar limitations to golf club design.

U.S. Pat. No. 6,814,673 is directed to grooves for iron-type golf clubs.

SUMMARY OF THE INVENTION

The present invention relates to golf clubs. In particular, the present invention relates to a golf club head having an improved striking surface. The golf club head of the present invention has a flat striking face, preferably being milled. This allows a greater degree of flatness than typically seen. Preferably, the face is flat within ±0.002 inch. Grooves or score lines are then cut into the flattened face. Typically, grooves are formed in the face as part of the head-forming process. For example, if the head is cast, typical grooves are formed as part of the casting process. The face—including the grooves—is then subject to post-casting process steps, such as polishing. Similar finishing steps are also typically performed on club heads that are formed by forging. Machining grooves in the face after it has been milled beneficially saves them from being affected by any face post-manufacturing processes, which can adversely effect, for example, the groove-face interface, making it inconsistent along the length of the groove.

Preferably, the grooves are angled or otherwise ramped from their maximum depth into the face to the face surface at the groove ends. This helps facilitate cleaning sand, dirt, and other debris from the grooves. This may be characterized in a variety of manners. For example, the maximum depth distance of the groove (that is, the non-ramped, or non-radiused, portion of the groove) versus the overall length of the groove. In one preferred embodiment, the overall groove length is at least 0.25 inch longer than the maximum depth distance. As another example, the grooves may be radiused at toe and heel portions of the golf club head, a preferred radius range being from 0.125 inch to 5 inches. The maximum depth of the grooves may be about 0.02 inch deep at a geometric center of the face.

The grooves of the present invention preferably are formed by spin milling or fly cutting. Forming the grooves in this manner allows for tighter draft angles, increases the rate of production, and allows for tighter tolerances than casting or forging. Preferably, the draft angle of the inventive grooves is between about 0.5° and 12°. The grooves may be formed by a round cutter, preferably having a diameter from 3/8 inch to 3/4 inch. A preferred draft angle range is from about 0.5° to 12°.

The surface of the club face may be textured or roughened. Providing a textured strike face allows the golfer to apply more friction to the ball during use, allowing the golfer to put more spin on the ball and have greater control of the ball. Preferably, the surface has a substantially uniform textured surface with a roughness greater than 40 Ra. The face may be selectively textured to enhance certain shots that the golfer may perform. This may include providing a plurality of distinct sets of texturing to accommodate a plurality of different shots. This selectively directional texturing may include the texturing step, preferably milling, in a single direction.

The present invention also includes a method of making the golf club head described above. One preferred method includes providing a cast or forged golf club head that includes a face and machining a plurality of grooves into the face. The plurality of grooves are machined into the face using a profiled cutter having a turning axis that is parallel to the face.

According to another method, a golf club head that includes a face is provided and a groove is machined into the face. The groove is machined using a profiled cutter that is configured to create an edge feature in a groove-to-face junction between the groove and the face.

In a still further method, a golf club head that includes a face is provided and a groove is machined into the face. The groove is machined using a profiled cutter that is configured to create an edge radius in a groove-to-face junction between the groove and the face. The groove has a width that is less than 0.045 inch and the profiled cutter has a turning radius that is parallel to the face.

DESCRIPTION OF THE DRAWINGS

The present invention is described with reference to the accompanying drawings, in which like reference characters reference like elements, and wherein.

DETAILED DESCRIPTION OF THE INVENTION

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Figure 1:
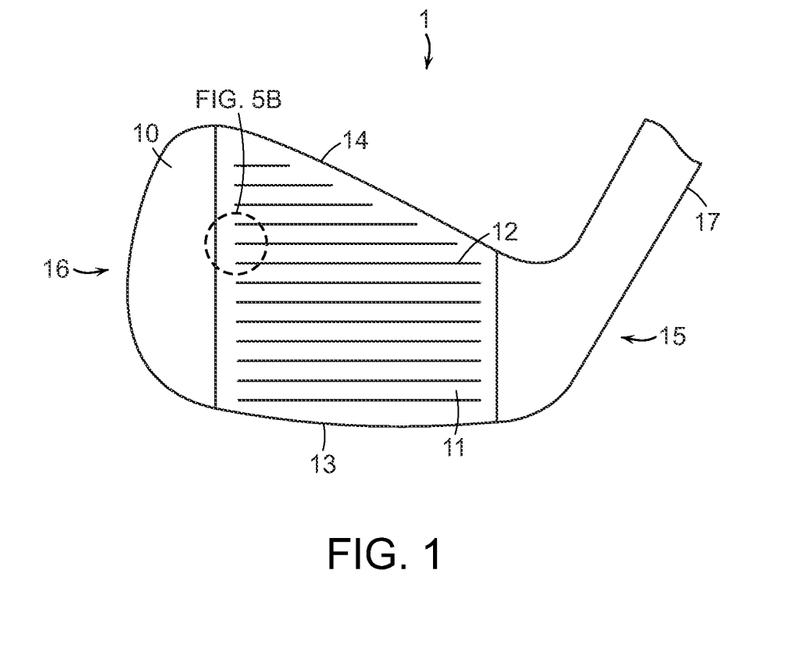
FIG. 1 shows a golf club head of the present invention.

The present invention is directed to a golf club head with an improved striking surface. FIG. 1 shows a golf club head 1 of the present invention. The golf club head 1 includes a body 10 defining a front surface 11, a sole 13, a top line 14, a heel 15, a toe 16, and a hosel 17. The striking face of the front surface 11, which contains grooves 12 therein, and the sole 13 may be unitary with the body 10, or they may be separate bodies, such as inserts, coupled thereto. While the club head 1 is illustrated as an iron-type golf club head, the present invention may also pertain to a utility-type golf club head or a wood-type club head.

Figure 2:
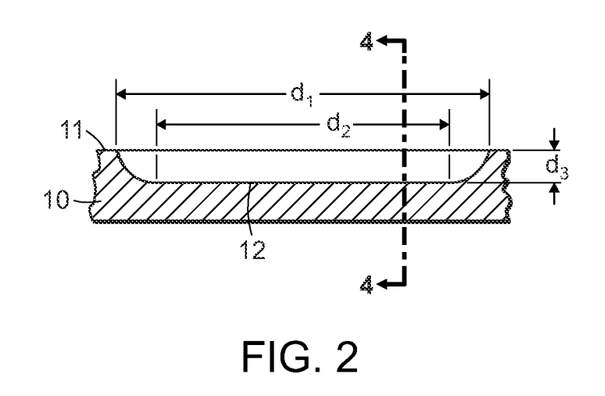
FIG. 2 shows a cross-sectional view of a club head of the present invention along a groove.

FIG. 2 shows a cross-sectional view of the club head 1 lengthwise along a groove 12. Grooves 12 are machined into the surface of the striking face 11, which allows the draft angle to be decreased. Grooves 12 extend from a toe end of the club head 1 to a heel end of the club head 1. The grooves 12 are shallow at both the toe and heel portions of the club head 1, and are deep in the central regions. Grooves 12 have a first distance d1 measured along the surface of striking face 11 and a second distance d2 measured along the deepest portion of the grooves, which have a depth d3. Thus, first distance d1 is an overall distance and second distance d2 is a maximum depth distance. Preferably, the groove depth along the maximum depth distance d2 is substantially constant. In one embodiment the maximum depth distance d2 is at least 0.25 inch shorter than the overall distance d1.

Figure 3:
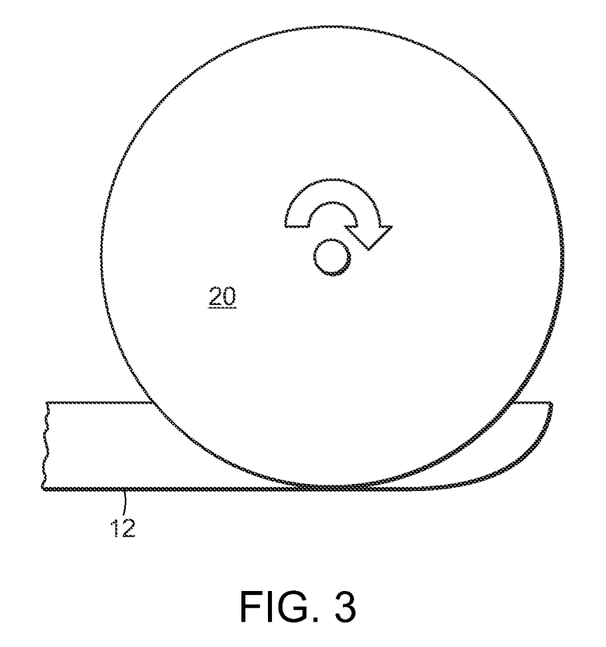
FIG. 3 shows a preferred groove cutting setup.
Figures 11, 12, 13, 14:
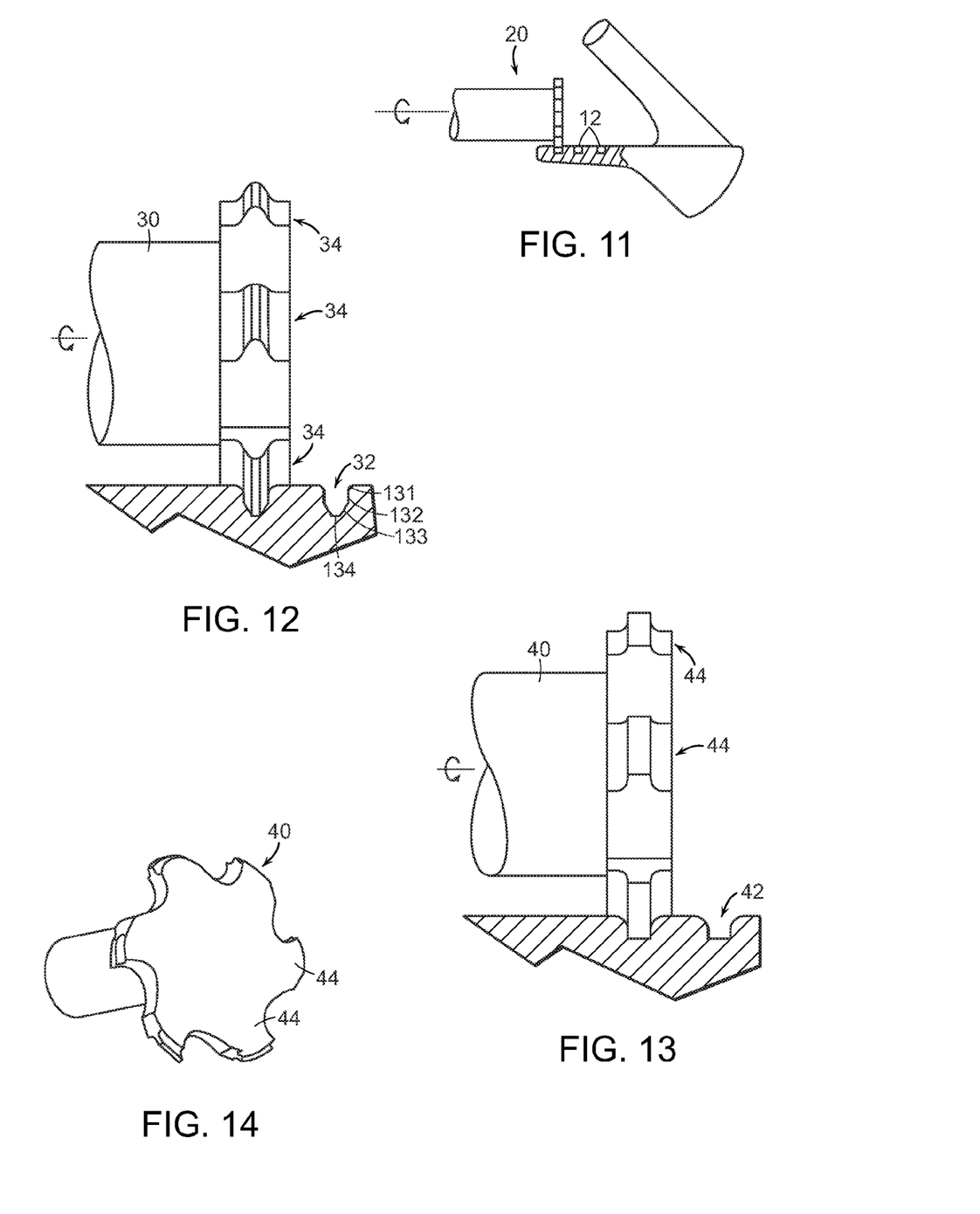
FIG. 11 is another side view of a groove cutting setup.
FIG. 12 is a side view of a profiled cutter in a groove cutting setup.
FIG. 13 is a side view of another profiled cutter in a groove cutting setup.
FIG. 14 is a perspective view of the profiled cutter of FIG. 13.

Grooves 12 are radiused at the toe and heel portions of the club head 1, and are about 0.02 inch deep at a geometric center of the face 11. Grooves 12 are machined into the strike face surface 11. The club head 1 is retained in a mold, which preferably is formed of a material soft enough to not damage the club head 1 yet resilient enough to firmly retain the golf club head 1, and a cutter, preferably a round cutter or a saw cutter, is used to form the grooves 12. As shown, the toe and heel portions are radiused about an axis of rotation that is perpendicular to a longitudinal axis of the groove. Furthermore, that axis of rotation is approximately parallel to face 11 of club head 1. Preferred cutters have a diameter from ⅜ inch to ¾ inch. A preferred range of groove radii include from 0.125 inch to 5 inches, with 0.25 inch to 2.5 inches being more preferred. Having radiused grooves 12 facilitates removal of dirt, grass, sand, and other materials that typically become embedded within the grooves of a golf club during normal use by eliminating corners that can trap these materials. FIGS. 3 and 11 show a preferred groove cutting setup illustrating cutter 20 with groove 12.

Machining the grooves 12, in addition to decreasing the draft angle, increases the rate of production and allows for tighter tolerances than casting or forging. The rate of production is increased by decreasing the number of required manufacturing steps. Instead of inserting the tool into the club face, machining the grooves, and removing the tool from the club face in three separate steps, as required by known groove creating processes, the present invention allows all three to be combined into one step. This is possible because the turning axis of the present cutter is parallel to the face, rather than the perpendicular axes of known processes. By orienting the turning axis of the cutter so that it is parallel to the face allows the groove profile to be created by building that profile into the edge of the cutter. As a result, complex groove geometries and tightly controlled dimensions, including the edge radius, may be created. The tighter tolerances possible with the present invention allow less material to be removed, also decreasing manufacturing time. Additionally, the orientation of the turning axis of the cutter parallel to the face allows the use of a more robust cutter. In particular, the maximum width of grooves 12 is generally in a range of about 0.030 inch to about 0.045 inch therefore a tool having a turning axis perpendicular to the face, such as an end mill, would require a maximum outer dimension of about 0.045 inch or less. A cutter configured to have a turning axis parallel to the face only requires a blade having a cutting edge width with that narrow dimension. The length of the blade may be greater than the width to provide support to the cutting edge, as shown in FIG. 14, so that the cutter may be less prone to breakage.

Figure 4A:
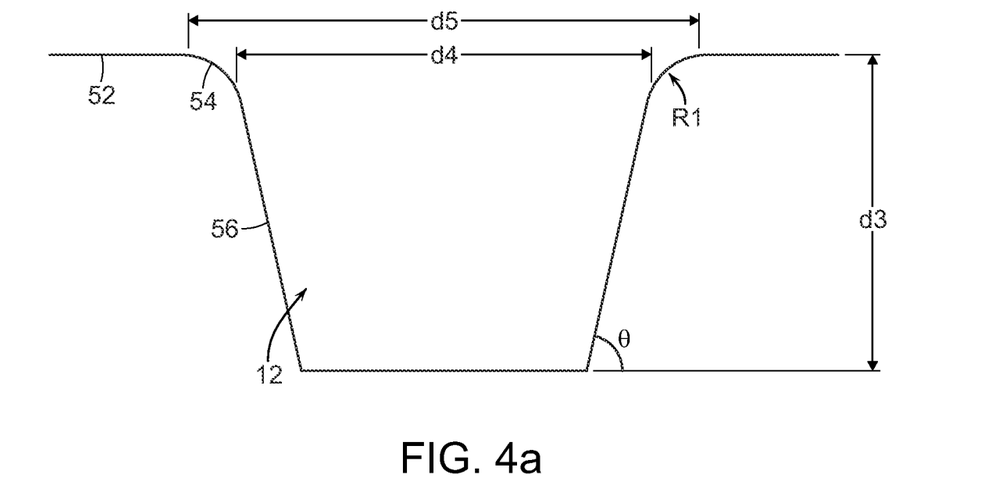
FIG. 4a shows a cross-sectional view of a groove of the golf club head in accordance with an exemplary embodiment of the present invention as viewed along lines 4-4 of FIG. 2.

FIG. 4a shows a cross-sectional view of a groove 12 in accordance with an exemplary embodiment of the present invention taken along cross-sectional line 4-4 shown in FIG. 2. More specifically, groove 12 may be constructed out of three sections, a horizontal hitting surface section 52, a radius section 54, and an angled groove wall section 56. Because the current cross-sectional view of the groove is taken along cross-sectional line 4-4, FIG. 4 only shows the deepest portion of the groove, having a depth d3 of about 0.010 inches to about 0.020 inches, more preferably greater than about 0.013 inches and less than about 0.017 inches, and most preferably about 0.015 inches. FIG. 4a also shows a gap distance d5, which reflects the gap distance of the groove 12 together with the width of the radius section 54. Distance d4, on the other hand, reflects the gap distance of the groove, at the internal portion of the radius section 54. Radius section 54, as shown in this current exemplary embodiment, may generally have a radius of curvature, R1, that is greater than about 0.004 inches and less than about 0.008 inches, more preferably greater than about 0.005 inches and less than about 0.007 inches, most preferably about 0.006 inches. Finally, FIG. 4 also shows the angled groove wall section 56 having a draft angle, θ, of greater than about 62 degrees and less than about 90 degrees, more preferably greater than about 66 degrees and less than about 83 degrees, most preferably about 76 degrees.

Based on the numbers above, it can be deduced that a particular relationship exists between the radius of curvature R1 and the draft angle θ that is capable of maximizing the performance of the grooves 12 of the golf club head within the USGA limits. More specifically, this particular relationship between the draft angle θ and the radius of curvature R1 may be more easily quantified as $R1 \geq (1*10^{-7}\theta^3) - (3*10^{-5}\theta^2) + 0.003\theta - 0.0891$, more preferably as $R1 \geq (9*10^{-8}\theta^3) - (2*10^{-5}\theta^2) + 0.0023\theta - 0.0658$, and most preferably as $R1 \geq (7*10^{-8}\theta^3) - (2*10^{-5}\theta^2) + 0.0017\theta - 0.0483$, wherein the radius of curvature R1 is measured in inches and the draft angle θ is measured in degrees.

Figure 4B:
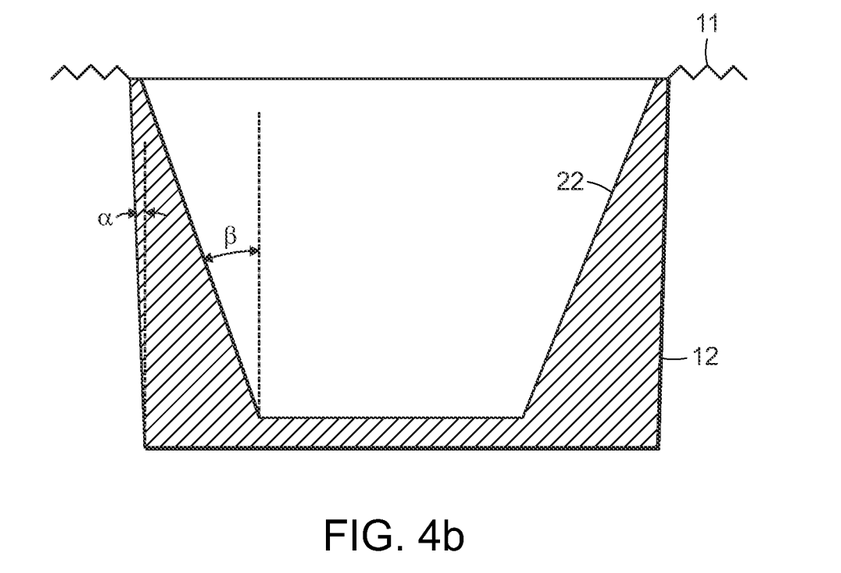
FIG. 4b shows a comparison of a groove of the golf club head of FIG. 1 as viewed along lines 4-4 of FIG. 2 with a known groove.

FIG. 4b shows a comparison of a groove 12 of the present invention with a typical groove 22 of known golf club heads. The groove 12 preferably has a depth of between about 0.010 inches to about 0.020 inches, more preferably greater than about 0.013 inches to about 0.017 inches, and most preferably about 0.015 inches. Due to loose tolerances, known grooves 22 were designed well short of this limit. Similarly, known manufacturing processes required a large draft angle β, typically around 16°. The draft angle α of grooves 12 is much smaller, increasing the cross-sectional area of the groove and groove volume for a given length.

As noted above, the governing bodies of golf place limitations of the geometry of grooves 12. The increased tolerance control afforded by machining the grooves 12 of the present invention allows the actual groove geometry to be closer to the limits than was previously achievable. Thus, the grooves 12 of the present invention maximize groove volume, enhancing the groove performance during use. With the improved grooves of the present invention, the grooves better grip the ball, allowing a golfer to apply more spin to the ball. The golfer's control over the ball, both during ball flight and subsequent to flight, such as when landing and settling on a golf green, are increased. The grooves 12 of the present invention also result in a golf club head that is more aesthetically pleasing and that allows better ball control.

Figure 5A:
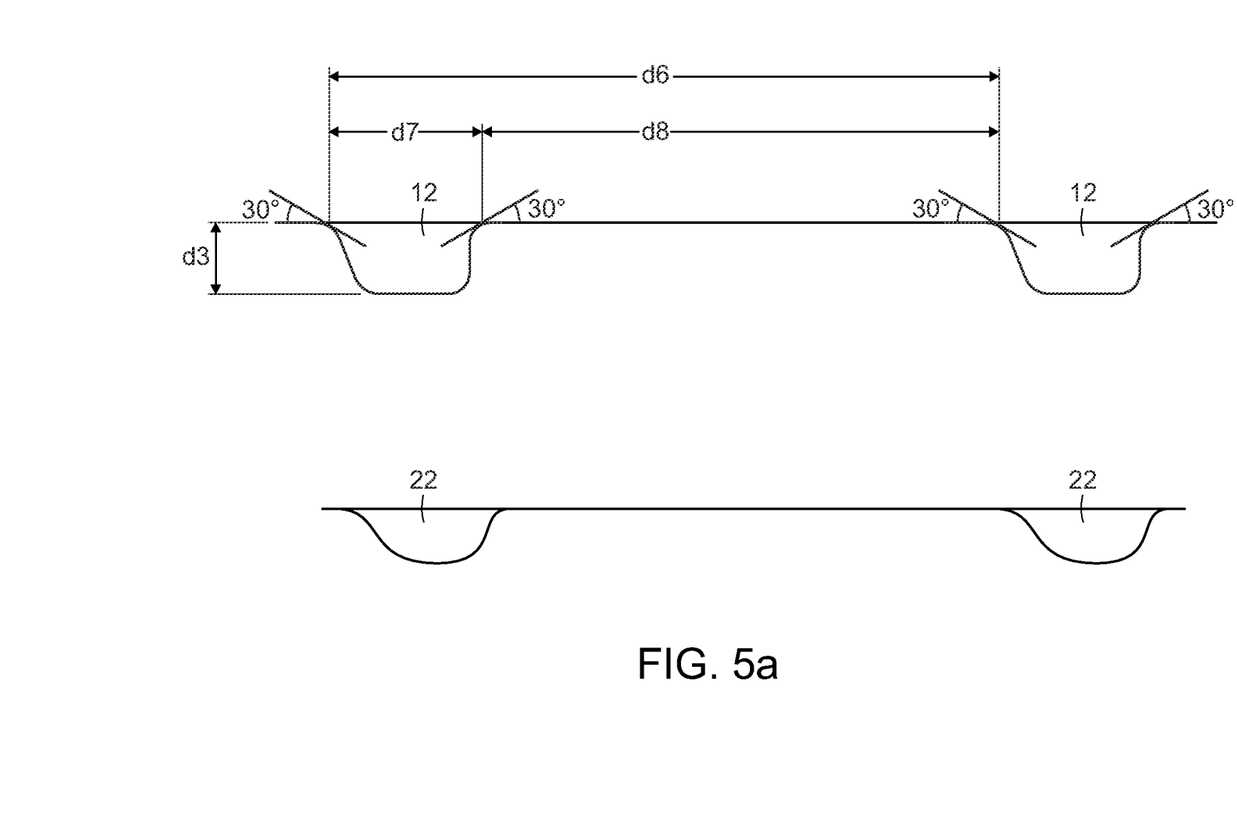
FIG. 5a shows a comparison of a groove of the golf club of FIG. 1 and a known groove.

FIG. 5a shows a comparison of a groove 12 of the present invention with a typical groove 22 of known golf club heads. The known grooves 22 are quite rounded. The grooves 12 of the present invention, however, are much sharper. The edges are more defined, the depth is greater, and the dimensions are more consistent and closer to the limits. All of these factors allow the golf club head 1 to better grip the golf ball, increasing the user's control over the ball.

In addition to the above, FIG. 5a also shows the distance of the grooves 12 from one another in accordance with an exemplary embodiment of the present invention. More specifically, FIG. 5a shows that the width d7 of each of the grooves and the separation distance d8 may generally combine to create a groove separation distance d6. This groove separation distance d6 may generally be calculated based on the 30° method of measurement. This 30° measurement method may generally refer to the methodology used to determine the groove separation distance d6 by the two points where a line, inclined at 30° to the land area of the club face, is tangent to the radiused edge of the groove, as shown in FIG. 5a. Groove separation distance d6, in accordance with the current invention, may generally be greater than about 0.100 inches and less than about 0.160 inches, more preferably greater than about 0.120 inches and less than about 0.140 inches, and most preferably about 0.122 inches.

It is worth recognizing here that although the radius of curvature R1 and the draft angle θ play a significant role in the amount of backspin performance achievable by a golf ball struck by a golf club, the groove separation distance d6 may also affect the backspin performance achievable by the golf club head. Hence, in order to provide an easier way to quantify this performance gain, a backspin performance ratio is created based on the equation $$\text{Backspin Performance Ratio} = \frac{\text{Draft Angle } (\theta) * \text{Groove Separation Spacing } (d6)}{\text{Radius of Curvature } (R1)}$$

that captures all three of the variables that significantly contribute to the backspin performance of the golf club head. A golf club head in accordance with an exemplary embodiment of the present invention may generally have a Backspin Performance Ratio of greater than about 1,000 degrees and less than about 3,500 degrees, more preferably greater than about 1,200 degrees and less than about 2,000 degrees, and most preferably about 1520 degrees.

Figure 5B:
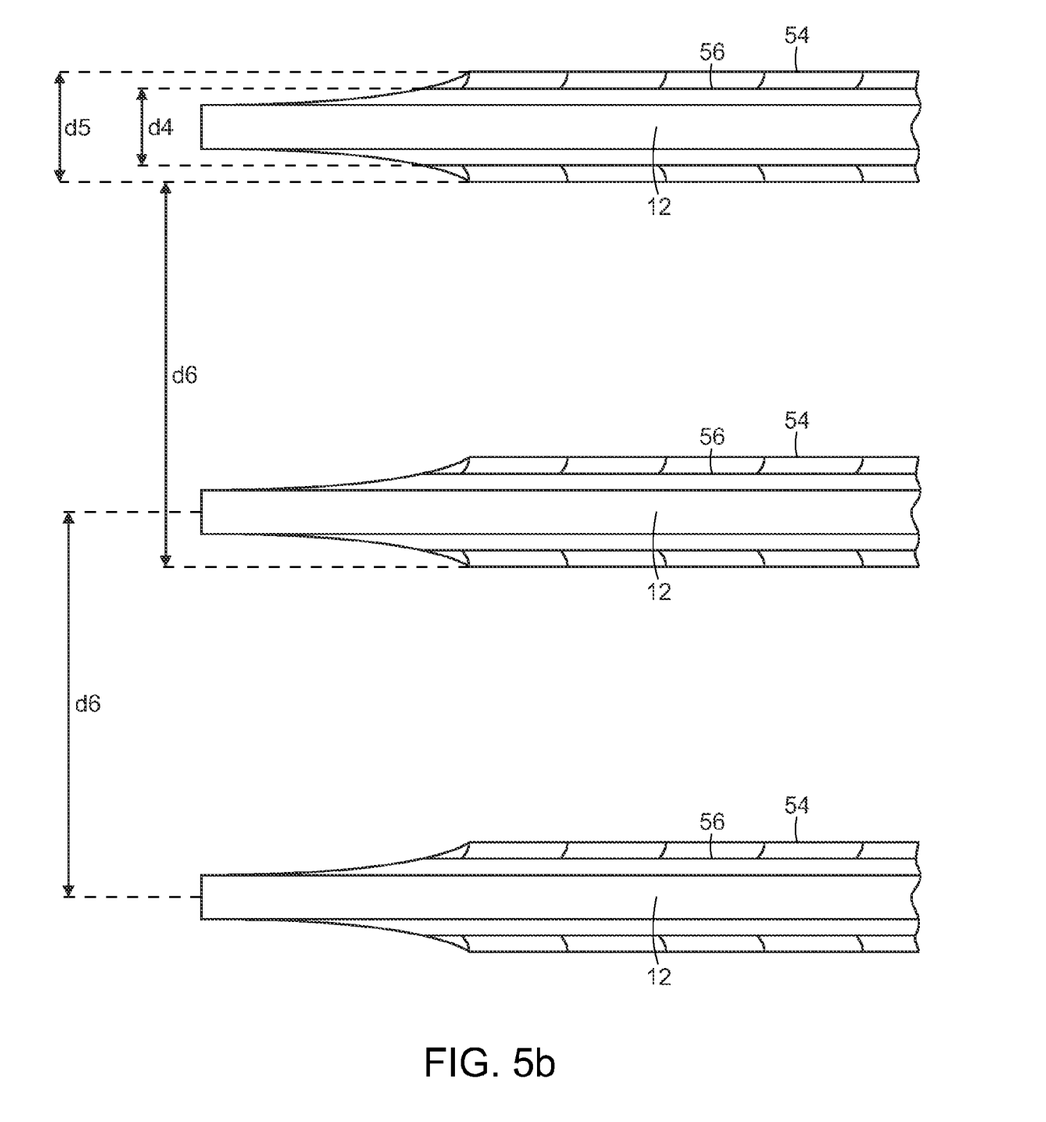
FIG. 5b shows an enlarged frontal view of the golf club head in accordance with the present invention as identified in FIG. 1, focusing on the shape, dimension, and the specific relationship between the grooves.
Figure 6:
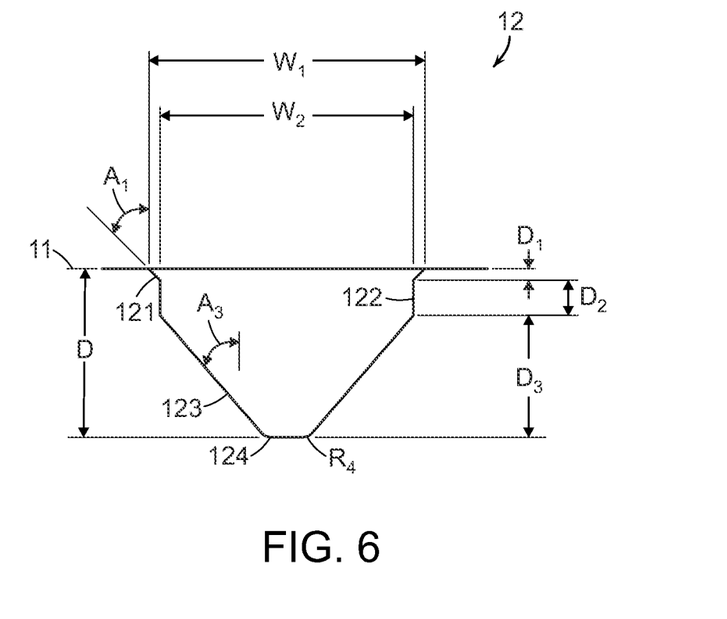
FIGS. 6-10 each show a cross-section of a preferred groove of the present invention.
Figure 7:
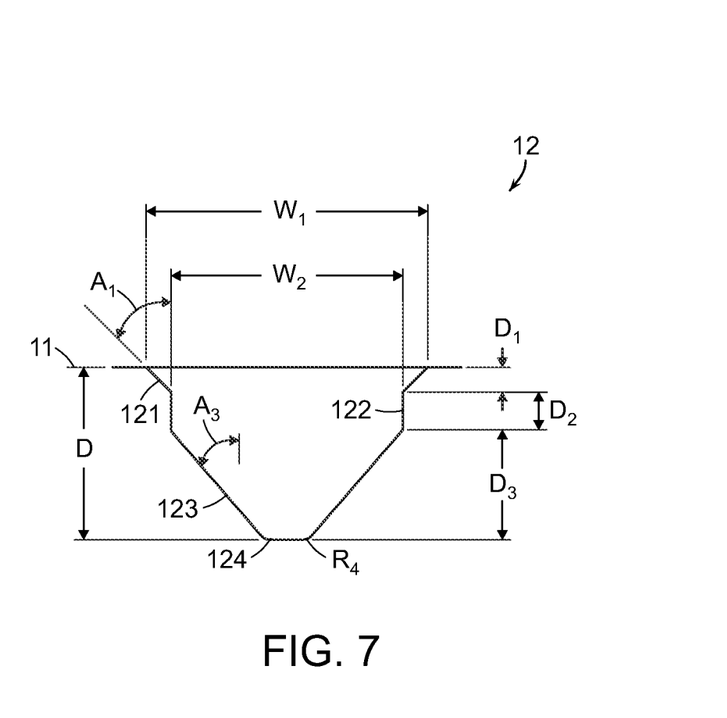
Figure 8:
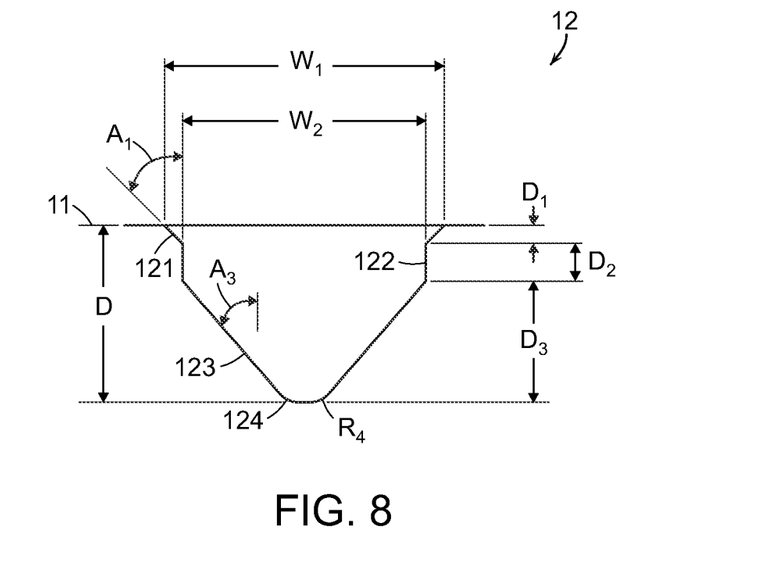
Figure 9:
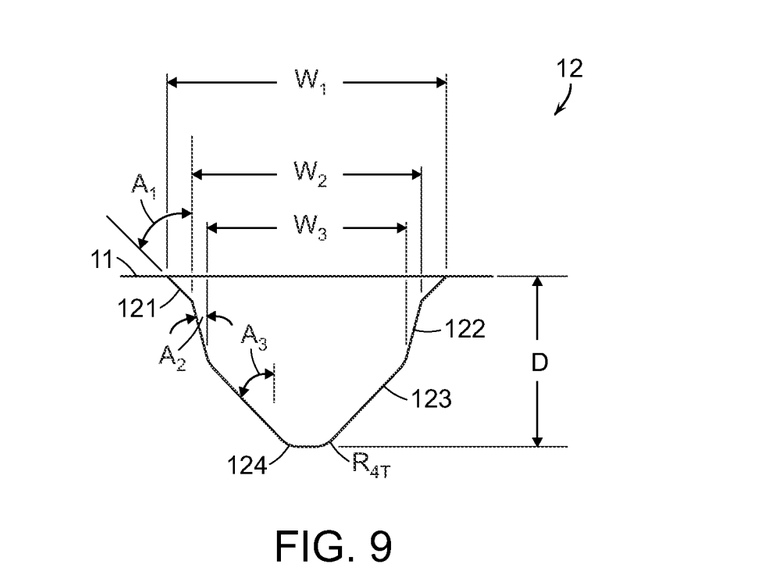

FIG. 5b shows an enlarged frontal view of the golf club head in accordance with the present invention as identified in FIG. 1. Although the prior discussions regarding the draft angle θ, groove separation spacing d6, and radius of curvature R1 above quantify the backspin performance ratio, it does not completely explain the resulting geometry of the inventive groove 12 as shown in FIG. 5b. This enlarged frontal view of the golf club head shows distance d4 and distance d5, as they are presented visually on a golf club head. Interestingly, because the current inventive golf club head has a more gradual angled groove wall portion 56, the frontal view of the golf club head will allow more of this portion to be visible. In addition to the above, because the radius of curvature of the radius section 54 is larger, more of this curvature can be seen from the frontal view of the golf club head as well. Finally, this frontal view of the grooves 12 of the golf club head shows an alternative methodology to quantify the same distance d6 between the grooves, spanning from the bottom edge to bottom edge, or even from the center of the groove to the center of the groove; all without changing the value of the separation distance d6 and without departing from the scope of the present invention.

The face 11 of the club head 1 of the present invention is also enhanced to provide additional ball control and enhanced performance. The strike surface 11 is provided with a roughened texture. A common measure of roughness in surface finish is average roughness, Ra. Ra, also known as Arithmetic Average (AA) and Center Line Average (CLA), is a measure of the distance from the peaks and valleys to the center line or mean. It is calculated as the integral of the absolute value of the roughness profile height over the evaluation length:

$$Ra = \frac{1}{L}\int_0^L |r(x)|\,dx$$

The face 11 is roughened by machining, preferably with a Computer Numerically Controlled (CNC) mill. Known golf clubs have a face roughness at most 40 Ra. At least a portion of the face 11 in the proximity of the grooves, and more preferably the entire face 11, is machined such that it has a substantially uniform textured surface with a roughness greater than 40 Ra. Preferably, the roughness is from 75 Ra to 300 Ra, more preferably from 100 Ra to 200 Ra, and most preferably from 120 Ra to 180 Ra.

Providing a textured strike face allows the golfer to apply more friction to the ball during use, allowing the golfer to put more spin on the ball and have greater control of the ball. Conventionally, golfers have to take a full swing to induce enough golf ball spin to control the ball movement on a golf green. With the golf club head of the present invention, a golfer can induce golf ball spin in "partial" shots, or shots when the golfer is not taking a full swing. The textured strike surface of the present invention also distributes the shear force resulting from the golf swing over a greater area of the golf ball. This reduces cover damage and extends golf ball life.

The golf club head 1 preferably is formed of a soft base metal, such as a soft carbon steel, 8620 carbon steel being an example. A chrome finish may be applied to the base metal to inhibit wear and corrosion of the base metal. If included, the chrome finish preferably includes a non-glare layer. The chrome finish layer preferably has a thickness between 0.005 μin and 280 μin, with 80 μin a preferred thickness. A nickel finish may additionally be applied to the base metal as a sub-layer for chrome or another finish layer or may alternatively be applied to the base metal as the finish layer. If included, the nickel finish preferably has a thickness between 400 μin and 1200 μin, with 800 μin a preferred thickness.

In use, the grooves 12 and strike face 11 of the present invention enhance performance, especially in adverse conditions. The higher friction possible with the golf club head 1 allows a tighter grip on the golf ball during "wet" or "grassy" conditions than was previously possible. The club head of the present invention was tested, and as shown in Table 1 below, the generated revolutions per minute of a struck golf ball were substantially the same as those generated with a conventional club for a full dry shot, but were increased in a half dry shot and in both a full wet shot and a half wet shot. The "dry" shots contained substantially no moisture on the club face and ball. For the "wet" shots, the club face and/or the golf ball surface were sprayed with water in an amount that would be typical for shots made during a round in dewy or rainy conditions. A 60° wedge was used in these tests. Table 1 shows the revolutions per minute of a golf ball after being struck with a standard club or a spin milled club of the present invention, and illustrates the benefit of the spin milled grooves over standard grooves.

TABLE 1

| Shot Conditions | Standard | Spin Milled |
| --- | --- | --- |
| Dry - full | 12250 | 12000 |
| Dry - half | 6500 | 7750 |
| Wet - full | 8000 | 12000 |
| Wet - half | 4000 | 8000 |

A preferred method of making the club head 1 includes first making a club head body. This may be done by casting, forging, or any other manufacturing method. The face is then machined such that it is substantially smooth and flat, preferably flat within ±0.002 inch. This preferably may be done by fly-cutting the face, which is cutting with a single-point tool fixed to the end of an arm protruding from a vertical milling shaft. Having a flat face allows the golfer to achieve consistent results during use. The body preferably is nested during the face flattening process. That is, the body is retained within a housing such that it is substantially immobile. The face is left exposed so that it can be worked on. The housing may be padded or otherwise designed such that it does not damage the club head.

Once the requisite face flatness has been achieved, the grooves are created and the surface is roughened as described above. While it is preferred that the grooves be spin milled prior to roughening the surface, the order of these steps is not essential. In fact, it is possible that they be performed substantially simultaneously, or with at least some amount of overlap.

The spin milled grooves may have very sharp edges, which could have an adverse effect on a golf ball during use. Thus, the grooves may be deburred to remove any sharp edges in the groove-to-face junction. This creates a radius at the junction, the radius preferably being less than 0.01 inch. This deburring can be carried out in a variety of ways. The junction may be filed, such as with a wire brush or a file, such as a carbide file. In conjunction with filing, or as an alternative method, the junction can be deburred by blasting. This may include impacting small beads at the junction at high speeds. To protect the face of the club head, which may have already been roughened above 40 Ra, the face may be masked. Masking includes placing a physical barrier on the face adjacent the grooves such that the projected particles cannot impact the face. Alternatively or in conjunction with masking, a nozzle can be used to accurately direct the projected material only at the junction. As a still further alternative, or additionally, a cutting tool that includes the desired edge profile may be utilized. For example, the profile of the cutting tool may be configured to match the desired groove profile.

Referring to FIGS. 12-14, profiled cutters that incorporate the profile of the desired groove into the cutting edge will be described. Utilizing a profiled cutter for the creation of the grooves provides the ability to maintain tighter tolerances (i.e., tolerances with a smaller range). The ability to maintain tighter tolerances increases manufacturing efficiency especially for golf club heads that are required to conform to the Rules of Golf and allows club head construction to be optimized for performance within the Rules. FIG. 12 illustrates a profiled cutter 30 that is configured to create faceted grooves 32. As described in greater detail below, faceted groove 32 includes a first portion 131 that interacts with club face 11, a second portion 132, a third portion 133 and a fourth portion 134. Cutter 30 includes a plurality of blades 34 that have a cross-sectional cutting shape that complements the desired shape of faceted grooves 32. In particular, blades 34 have portions corresponding, and complementary, to first portion 131, second portion 132, third portion 133 and fourth portion 134. As illustrated, first portion 131 of groove 32 is a radiused edge that is formed by a complementary radiused portion of blade 34. Because the edge feature (e.g., the edge radius, or an edge facet) is cut using profiled cutter 30 in a very controllable process, the dimensions of that feature are easier to control than with a less controlled process, such as using a wire brush.

In another example, illustrated in FIGS. 13 and 14, a profiled cutter 40 is utilized to form grooves 42. Grooves 42 are machined into face using cutter 40 which has profiled blades 44 and include an edge radius and sidewalls that are substantially parallel with draft angles from about 0.5° to about 12°. By utilizing a profiled cutter to machine the grooves, a 30% reduction in tolerance on the edge radius has been repeatable in a production environment, as compared to a maintainable tolerance using wire brushing. In a sampling of over 1400 grooves constructed with a profiled cutter like that shown in FIGS. 13 and 14, the grooves were successfully constructed within a tolerance of +/−0.0014 inch, as compared to wire brushing, which has a maintainable tolerance of no tighter than +/−0.002 inch. Additionally, a profiled cutter is less likely to create burrs, which can force a groove out of conformance with the Rules.

FIGS. 6-10 each show a cross-section of a preferred faceted groove 12 that may be formed by the method described above. The groove 12 includes a first portion 121 adjacent to and interacting with the club face 11. In some embodiments, the edges of the groove 12 have been deburred, either having a radius or being angled. Preferably, the radius or angled edge is created using a spin milling tool that has the feature incorporated into the complementary cutting profile. In embodiments incorporating an angled edge, such as those of FIGS. 6-9, a preferred range of angles $A_1$ is about 10° to 50°. In embodiments incorporating a radiused first portion, the radius is preferably less than 0.015 inch and more preferably less than 0.010 inch. The width $W_1$ of the groove 12 at the strike face 11, which is generally the widest portion of the groove 12 and the maximum groove width, is between about 0.030 inch to about 0.045 inch, and is preferably about 0.035 inch. The width transitions narrower through the first groove portion 121 to a width $W_2$ that is between about 0.033 and about 0.020 inch at the lowermost boundary of the first portion 121, also referred to as the distal end of the first portion 121. The first portions of the illustrated embodiments of FIGS. 6-10 are similar, but extend to varying depths $D_1$. The embodiment illustrated in FIG. 6 has the shallowest depth $D_1$, and the embodiment illustrated in FIG. 10 has the deepest depth $D_1$. The first portion 121 has a depth $D_1$ between about 0.001 and 0.008, preferably having a depth $D_1$ of approximately 0.005 inch, with 0.001 to 0.003 inch being more preferred. In some preferred embodiments, the first portion 121 has a depth $D_1$ that is about 20% to about 40% of the overall groove depth D, and more preferably about 35% of the overall groove depth D. The overall groove depth D preferably is between about 0.0150 and 0.0225 inch, more preferably about 0.02 inch.

The groove 12 includes a second portion 122 adjacent to the first portion 121. Second portion 122 preferably has substantially parallel walls that are substantially perpendicular to the face 11, "substantially" herein meaning the walls may be angled at an angle $A_2$ of up to about 20°. Preferably, the walls defining the second portion 122 are spaced as far apart as possible to maximize the volume of the groove 12. A preferred range of widths $W_2$, $W_3$ is about 0.033 to 0.027 inch. In relative terms, the width $W_2$ at a proximal end of second portion 122 is the maximum width of the second portion 122 and is preferably from about 80% to 98% of the maximum groove width $W_1$. Preferably, the width $W_3$ at a distal end, or the bottom portion, of the second portion 122 is at least about 80% of the width $W_2$ at a top portion of the second portion 122. A preferred range of depths $D_2$ is between about 0.003 inch and about 0.008 inch. In some embodiments, the second section depth $D_2$ is at least half the overall groove depth D. In other embodiments, however, the second portion 122 has a depth $D_2$ that is about 15% to about 35% of the overall groove depth D.

The groove 12 includes a third portion 123 adjacent the second portion 122 and further distal from face 11. This portion 123 has a V-shape, having angled side walls each having an internal angle $A_3$ of about 35° to about 55°, as measured from a plane normal to face 11. Thus, the width of the third portion 123 decreases from a proximal end, or the top portion thereof (nearest the face 11), to the distal end, or bottom portion thereof. Preferably, the width at the bottom of the third portion is less than about half of the width of the top portion. In some preferred embodiments, the depth $D_3$ of the third portion 123 may be from about 0.006 inch to about 0.015 inch. The depth $D_3$ of the third portion 123 preferably is at least twice the depth $D_2$ of the second portion 122. In some preferred embodiments, the third portion 123 has a depth $D_3$ that is about 35% to about 55% of the overall groove depth D.

The groove 12 includes a fourth portion 124 adjacent to the third portion 123 that extends between the angled side walls of the third portion 123. This portion 124 may be radiused to join the walls of the third section 123. A preferred radius $R_4$ is less than 0.012 inch. In other embodiments, the fourth portion 124 includes a substantially planar portion that extends between the opposite angled side walls of the third portion 123. The planar portion may intersect one or both angled side wall of the third portion 123 at a radius $R_4$. In embodiments including a planar fourth portion 124, the width $W_4$ of that portion is preferably about 0.002 inch to about 0.010 inch, and more preferably about 0.006 inch.

Figure 10:
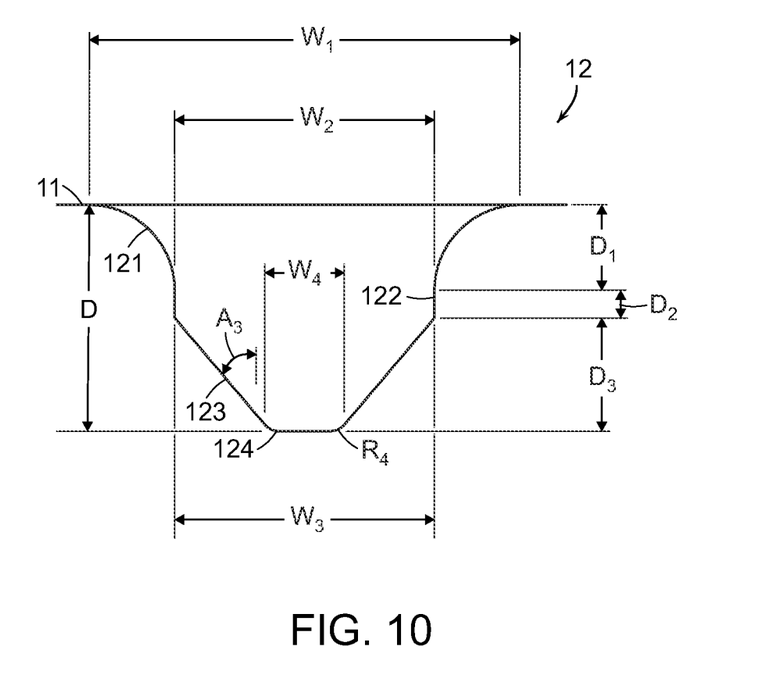

Grooves 12, like the faceted groove shown in FIG. 10, were tested against V-shaped grooves on wedges having a static loft angle of 60° by players hitting golf balls out of the rough. The players had club head swings in a range of 50 mph to 80 mph. The tested V-grooves included angled side walls having an internal angle of about 38°.

For each of the players, the faceted grooves of the present invention increased back spin over the V-grooves. Generally, the spin rate increased between about 8% to about 41% for club head speeds in that range. Table 2 shows the revolutions per minute of a golf ball after being struck with the test club having V-grooves and the test club having grooves of the present invention for various swing speeds.

TABLE 2

| Swing Speed | V-Groove | Faceted Groove | % Increase |
| --- | --- | --- | --- |
| 57 mph | 2480 | 2680 | 8% |
| 65 mph | 2610 | 3690 | 41% |
| 72 mph | 2960 | 3780 | 28% |

Portions of the golf clubs of the present invention may also be hardened to increase wear resistance. As a result, the grooves are more resistant to dimensional changes caused by use. Preferably, the club head material adjacent the grooves is hardened. The hardness is increased by applying extremely high heat to at least a portion of the golf club head and subsequently quenching the golf club head. For example, localized hardening of the material may be accomplished by applying extremely high localized heating, such as with a laser, and subsequently oil quenching the golf club head.

In an embodiment, only the material on a side of each of the grooves nearest a top line of the golf club head is hardened. For example, the golf club head includes a hardened portion that extends from the side of each groove about 0.05 inch toward the top line. The depth of each hardened portion is generally less than or equal to about 0.005 inch deep from the club face. Preferably, the depth tapers from a thickest portion adjacent the groove. In an example, a golf club head constructed of carbon steel having a hardness of about 90 on the Rockwell Hardness B scale and includes localized hardened portions, such as those described above, that have a hardness of about 45 on the Rockwell Hardness C scale.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus, the present invention should not be limited by the above-described exemplary embodiments, but should be defined only in accordance with the following claims and their equivalents.

What is claimed is:

1. A golf club head comprising a face with a striking surface with grooves formed therein, wherein said grooves includes at least one groove, said at least one groove further comprises;
    a radius section having a radius of curvature, R1, near said striking surface of said groove, and
    an angled groove wall section having a draft angle θ;
    wherein said relationship between said radius of curvature, R1, and said draft angle, θ, satisfies the equation $$R1 \geq (9*10^{-8}\theta^3) - (2*10^{-5}\theta^2) + 0.0023\theta - 0.0658.$$

2. The golf club head of claim 1, wherein said relationship between said radius of curvature, R1, and said draft angle, θ, satisfies the equation $$R1 \geq (7*10^{-8}\theta^3) - (2*10^{-5}\theta^2) + 0.0017\theta - 0.0483,$$

wherein said radius of curvature, R1, is greater than about 0.004 inch and less than about 0.08 inch, and
wherein said draft angle, θ, is greater than about 62 degrees and less than about 90 degrees.

3. The golf club head of claim 1, wherein said radius of curvature, R1, is greater than about 0.004 inch and less than about 0.08 inch; and wherein said draft angle, θ, is greater than about 62 degrees and less than about 90 degrees.

4. The golf club head of claim 3, wherein said radius of curvature, R1, is greater than about 0.005 inch and less than about 0.007 inch; and wherein said draft angle, θ, is greater than about 66 degrees and less than about 83 degrees.

5. The golf club head of claim 1, wherein said grooves are separated by a groove separation distance, d6, yielding a backspin performance ratio of greater than about 1,000 degrees and less than about 3,500 degrees;
    said backspin performance ratio defined as said draft angle, θ, multiplied by said groove separation distance, d6, all divided by said radius of curvature, R1.

6. The golf club head of claim 5, wherein said backspin performance ratio is greater than about 1,200 degrees and less than about 2,000 degrees.

7. The golf club head of claim 6, wherein said backspin performance ratio is about 1520 degrees.

8. The golf club head of claim 1, wherein said at least one groove has an overall distance and a maximum depth distance that is at least 0.25 inch shorter than the overall distance, and wherein said at least one groove contains a longitudinal axis, and the grooves are radiused at toe and heel portions of the golf club head about an axis of rotation that is perpendicular to the longitudinal axis.

9. The golf club head of claim 8, wherein said at least one groove is radiused from about 0.125 inch to about 5.0 inch.

* * * * *